March 8, 1966  F. F. FLOWERS  3,239,236
EQUALIZER SUSPENSION FOR VEHICLES
Filed Aug. 27, 1963  3 Sheets-Sheet 1
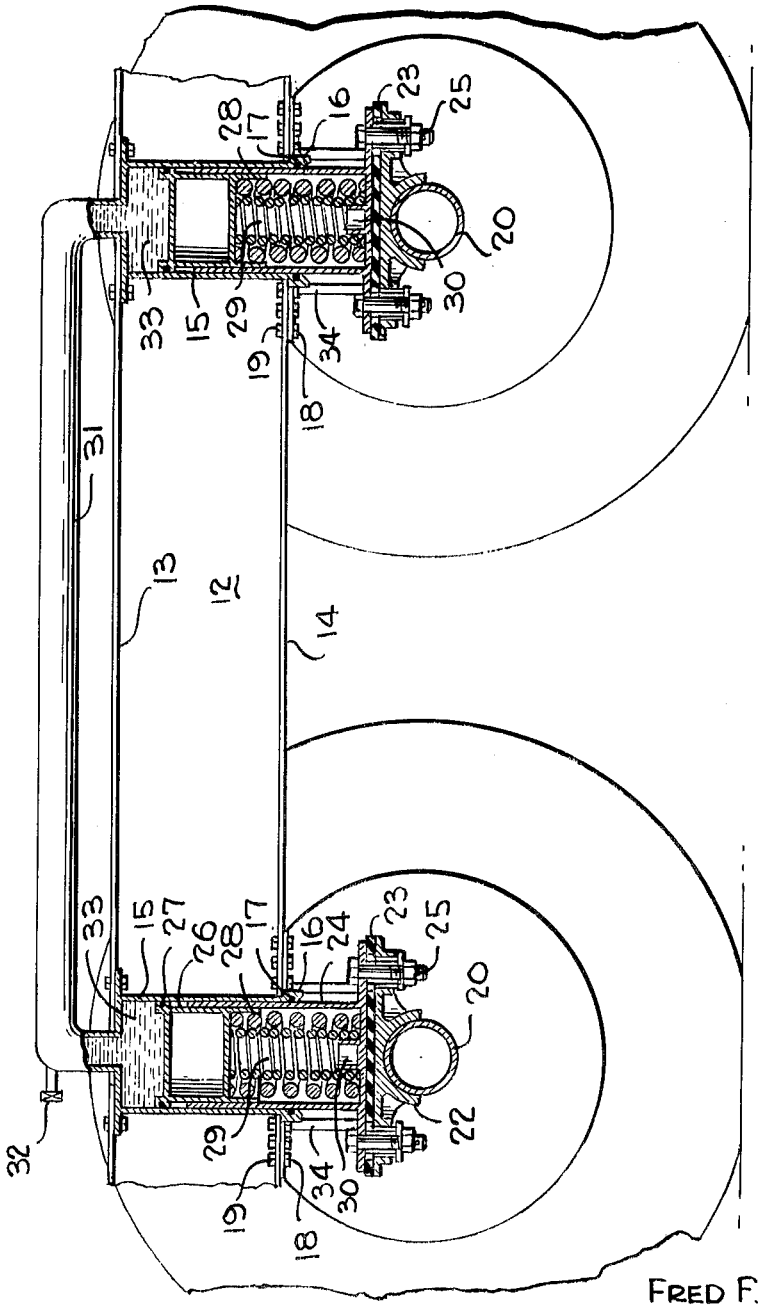
FRED F. FLOWERS
INVENTOR
BY *Mason, Porter, Miller & Stewart*
ATTORNEYS

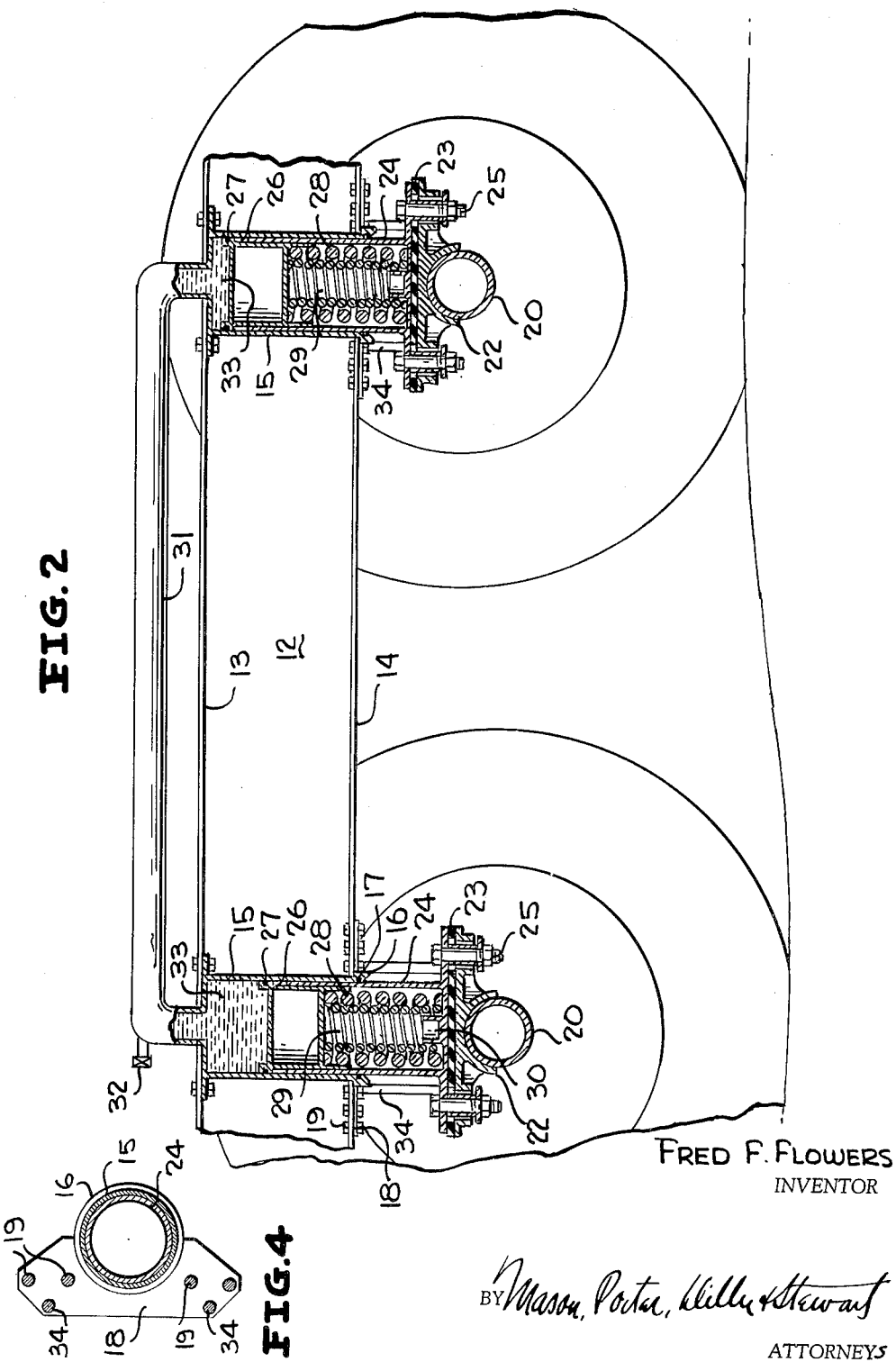

March 8, 1966 F. F. FLOWERS 3,239,236
EQUALIZER SUSPENSION FOR VEHICLES
Filed Aug. 27, 1963 3 Sheets-Sheet 3
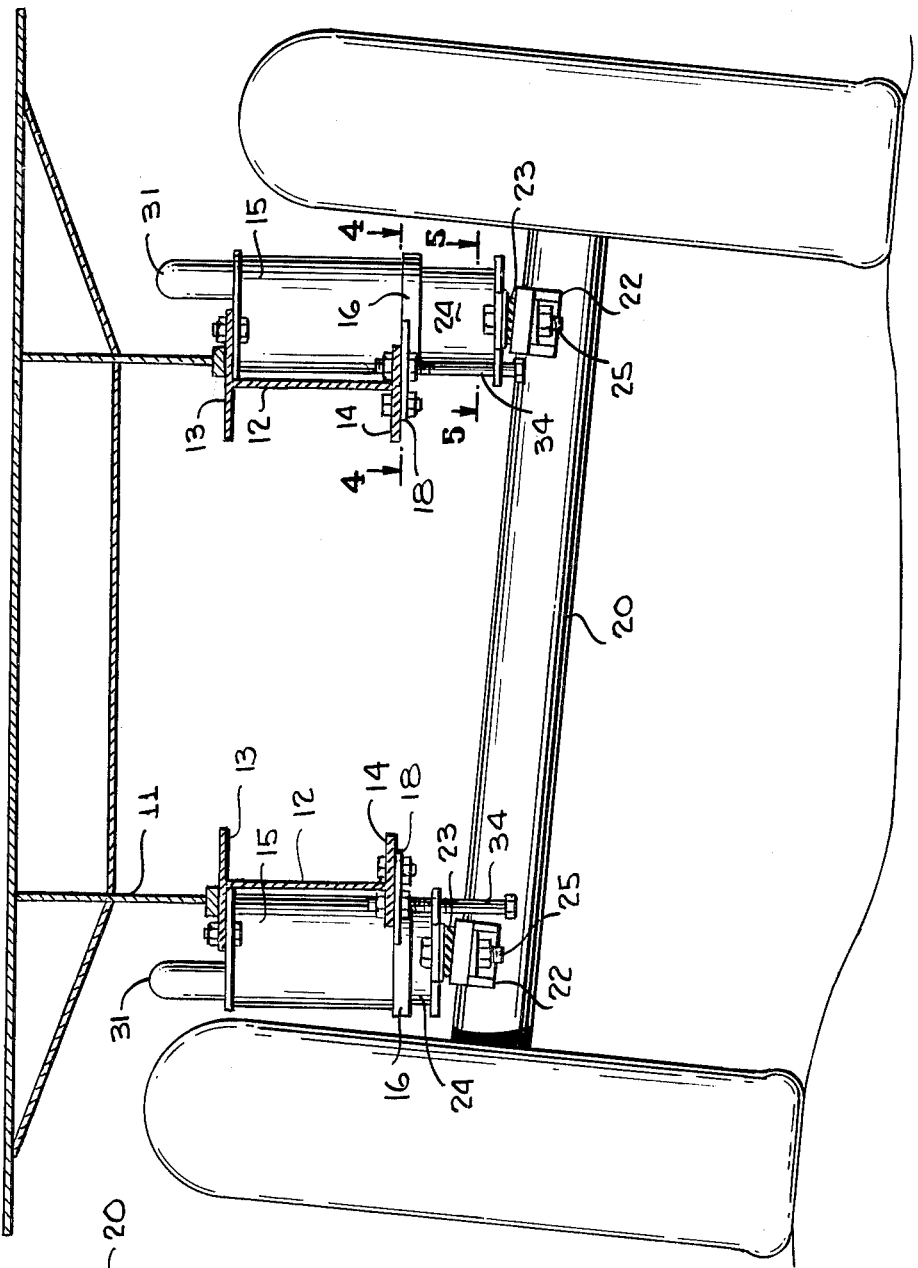
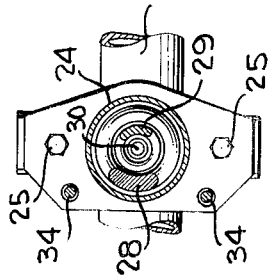
FRED F. FLOWERS
INVENTOR
BY *Mason, Pater, Miller & Stewart*
ATTORNEYS

# United States Patent Office 3,239,236
Patented Mar. 8, 1966

3,239,236
EQUALIZER SUSPENSION FOR VEHICLES
Fred Fort Flowers, P.O. Box 238, Findlay, Ohio
Filed Aug. 27, 1963, Ser. No. 304,790
6 Claims. (Cl. 280—104.5)

The following specification relates to the hydraulic equalizing suspension for vehicles, primarily road vehicles.

In traversing uneven roadways, there are frequent instances where the axle of the vehicle is tilted by reason of one wheel being raised higher than the other. Similarly, the wheels on the same side of the vehicle may also be on uneven ground with one higher than the other. This unevenness can be confined to the unsprung structure by imposing an equalizing force between the front and rear axles on the same side of the vehicle. In particular, this construction is desirable where the front and rear axles are part of a tandem truck.

One of the objects of the invention is to provide a tandem axle spring suspension for the vehicle, utilizing an incompressible liquid to impose equal loads on the two axles during a differential vertical axle movement.

A further object of the invention is to provide such an equalizing force by the use of individual spring suspensions interconnected by an equalizer and with a minimum of external moving parts exposed to dust and dirt.

A still further object of the invention is to provide such an equalizing means regardless of excess differential movements caused by uneven terrain.

Among the objects of the invention is to provide equalizing means between tandem axles in which there is a minimum of weight.

A further object of the invention is to mount the equalizing spring units upon the individual axles with provision for flexible movement between the equalizing means and the axle.

As illustrating the preferred form of the invention it has been shown by way of example on the accompanying drawings in which:

FIGURE 1 is a side elevation partly in section of tandem trucks and their mounting on the sills of a vehicle;

FIGURE 2 is a similar view partly in section when one axle is higher than the other;

FIGURE 3 is an end elevation partly in section when an axle is tilted laterally;

FIGURE 4 is a horizontal section on the line 4—4 on FIGURE 3 and

FIGURE 5 is a fragmentary horizontal section on the line 5—5 on FIGURE 3.

In general, the hydraulic equalizer spring suspension of the present invention consists of interconnected liquid chambers on the same side of a vehicle with pistons movable inversely in the chambers. An equal load is interposed on each piston through a nest of coil springs which in turn is loaded by a bearing plate girded by an attached tube which extends into the chamber. The bearing plate receives its load from one end of an axle through a connection sufficiently flexible that it allows tilting of the axle relative to the bearing plate.

As shown in the drawings, the vehicle body 11 has on each side an I-shaped underframe sill 12, running longitudinally. These sills have an upper outer flange 13 and a lower outer flange 14.

A piston cylinder 15 is bolted on the underside of the upper flange 13 and extends beneath the lower flange 14, where it has an open end. The open end is surrounded by a rim 16. This rim 16 has an internal sealing O-ring 17.

The lower flange 14 has a bracket 18 which is bolted as at 19 to the lower flange 14.

The bracket 18 is above axle 20 of the wheel 21. The axle 20 has a fixed seat 22.

A flexible pad 23 of rubber is bonded to the top surface of the seat 22.

An inner cylinder or housing 24 has a lower flange which rests upon the pad 23. Bolts 25 pass through the flange of the inner cylinder 24, the pad 23 and the seat 22, where they are firmly held.

The inner cylinder 24 extends upwardly and slides within the outer cylinder 15.

A free piston 26 fits slidably within the inner cylindrical housing 24. The piston 26 has an upper rim 27 which slides closely within the outer cylinder 15 and a depending closed skirt which slides within the housing 24.

The free piston 26 is supported on two coil springs 28 and 29. The inner coil spring fits over a central boss 30 in the bottom of the inner cylinder 24. This spring is nested within or centrally displosed with respect to the outer spring 28. Both springs rest upon the bottom of the inner cylinder 24 and the upper ends support the free piston 26. The outer spring 28 is materially stronger than the inner spring 29.

Each axle 20 is equipped with a cushioning unit such as above described. The pressure cylinders 15, 15 are connected by a conduit 31. The conduit has its ends within the upper ends of the pressure cylinders 15, 15. The conduit 31 is also equipped with a fixture or check valve 32 by which pressure liquid 33 is supplied to the spaces within the cylinders 15 and above the free pistons 26, 26. In this way replacement fluid is supplied to comensate for any possible loss due to leakage.

Safety bolts 34 depending from the bracket 18 pass through the flanges of the inner cylinder 24. This is a safety measure forming a definite stop against abnormal movement of the inner cylinders 24 relative to the outer cylinders 15.

On a level roadway or terrain, the pressure fluid in both pressure cylinders 15, 15 will be the same. This pressure thus transmits the weight of the vehicle to the free pistons 26, 26 and the springs 28, 29. Thus each axle 20, 20 and the corresponding wheels 21 will sustain equal ratios of the vehicle and its load.

If, however, the successive wheels on the same side traverse an uneven terrain, the wheels take the relative positions shown in FIGURE 2. Thus the higher wheel will apply greater compression against the pressure fluid 33 in its cylinder. This pressure in turn will be transmitted directly to the opposite pressure cylinder 15. The free piston 26 will then serve to compress the springs 28 and 29 and increase the load applied to the wheel 21. In this way the weight of the vehicle and its load remains evenly distributed between the two wheels.

It frequently happens that the unevenness of the road is such that the axle 20 is tilted sidewise in a manner shown in FIGURE 3. In this instance again the increase of pressure in one cylinder 15 is transmitted to the corresponding cylinder on the same side for the following wheel. The result is therefore that the increase in pressure in the first cylinder is cushioned by a corresponding increase in pressure in the following cylinder.

The above description of the preferred form of the invention is without limitation to changes in structure, proportions and materials within the scope of the following claims.

What I claim is:

1. The combination with the underframe of a vehicle, a pair of axles, two longitudinally spaced pressure cylinders mounted on each side of the underframe above the axles, a tube connecting the cylinders on each side of the underframe for the interchange of pressure fluid between said cylinders, a spring housing having a flange elastically mounted on each axle, stop bolts on the underframe passing through said flange, said housing slidably extending into the adjacent pressure cylinder, a free piston in each pressure cylinder with a depending skirt slidable within the housing and a spring carried by the housing and supporting the piston.

2. The combination with the underframe of a vehicle, a pair of axles, two longitudinally spaced pressure cylinders mounted on each side of the underframe above the axles, a tube connecting the cylinders on each side of the underframe for the interchange of pressure fluid between said cylinders, a spring housing having a flange elastically mounted on each axle, stop bolts on the underframe passing through said flange, said housing slidably extending into the adjacent pressure cylinder, a free piston in each pressure cylinder and two concentric springs of dissimilar strength carried by the housing and supporting the piston.

3. The combination with the underframe of a vehicle, a pair of axles, two longitudinally spaced pressure cylinders mounted on each side of the underframe above the axles, a tube connecting the cylinders on each side of the underframe for the interchange of pressure fluid between said cylinders, a spring housing having a flange elastically mounted on each axle, stop bolts on the underframe passing through the housing flange, said housing slidably extending into the adjacent pressure cylinder, a free piston in each pressure cylinder and a spring carried by the housing and supporting the piston.

4. The combination with the underframe of a vehicle of side sills having upper and lower side flanges, brackets bolted to the lower flanges, two longitudinally spaced pressure cylinders mounted on the upper flanges and said brackets, a tube connecting the cylinders on each side of the underframe for the interchange of pressure fluid between said cylinders, an axle below each pressure cylinder, a spring housing having a flange elastically mounted on each axle, stop bolts on the underframe passing through the housing flange, said housing slidably extending into the adjacent pressure cylinder, a free piston in each pressure cylinder and a spring carried by the housing and supporting the piston.

5. The combination with the underframe of a vehicle, of side sills having upper and lower side flanges, brackets bolted to the lower flanges, two longitudinally spaced pressure cylinders mounted on the upper flanges and said brackets, a tube connecting the cylinders on each side of the underframe for the interchange of pressure fluid between said cylinders, an axle below each pressure cylinder, a seat on each axle, a spring housing having a flange elastically attached to each seat, stop bolts on the underframe passing through the housing flange, said housing slidably extending into the adjacent pressure cylinder, a free piston in each pressure cylinder and a spring carried by the housing and supporting the piston.

6. The combination with the underframe of a vehicle, of side sills having upper and lower side flanges, brackets bolted to the lower flanges, two longitudinally spaced pressure cylinders mounted on the upper flanges and said brackets, a tube connecting the cylinders on each side of the underframe for the interchange of pressure fluid between said cylinders, an axle below each pressure cylinder, a seat on each axle having an elastic pad mounted on its upper surface, a spring housing on each axle and slidably extending into the adjacent pressure cylinder, said housing having a flange, a free piston in each pressure cylinder, a spring carried by the housing and supporting the piston, bolts connecting each housing flange with the axis seat below, and stop bolts on the underframe passing through each housing flange.

References Cited by the Examiner

UNITED STATES PATENTS

| 2,094,882 | 10/1937 | Garnett | 280—104 |
| 2,325,430 | 7/1943 | Setz | 267—34 |
| 2,917,318 | 12/1959 | Nallinger | 280—104 |
| 3,055,677 | 9/1962 | Smith | 280—104.5 |

FOREIGN PATENTS 328,974  5/1903  France.

BENJAMIN HERSH, *Primary Examiner.*

A. HARRY LEVY, MILTON BUCHLER, *Examiners.*